United States Patent Office 3,808,160
Patented Apr. 30, 1974

3,808,160
CROSS-LINKABLE COATING COMPOSITION OF A HYDROXYL CONTAINING POLYESTER AND A BLOCKED POLYISOCYANATE
William H. Steinmetz, Collingswood, N.J., assignor to E. I. du Pont de Nemours and Company, Wilmington, Del.
No Drawing. Continuation-in-part of abandoned application Ser. No. 41,542, May 28, 1970. This application Feb. 28, 1972, Ser. No. 230,046
Int. Cl. C08g 22/32; C08b 21/06
U.S. Cl. 260—16
1 Claim

ABSTRACT OF THE DISCLOSURE

The novel coating composition of this invention is composed of a polymer blend of a polyester which is a reaction product of a polyol and a dicarboxylic acid or an anhydride thereof and a blocked polyisocyanate which cross-links upon heating to form a tough, flexible, durable, scratch resistant, stain resistant coating; these coatings are particularly useful as appliance finishes for refrigerators, stoves, washers, dryers, and the like and can be used as a coating for exterior aluminum siding and can be used as a coil coating for sheets of steel and aluminum that are post-formed in a subsequent manufacturing operation.

RELATED APPLICATIONS

This application is a continuation-in-part of Ser. No. 41,542, filed May 28, 1970 now abandoned.

BACKGROUND OF THE INVENTION

This invention relates to a thermosetting coating composition and in particular to a thermosetting coating composition of a hydroxyl containing polyester and a blocked polyisocyanate.

Thermosetting coating compositions are well known in the art, and in particular thermosetting compositions utilizing polyesters are known in the art, as shown in Sekmakas U.S. 3,457,324, issued July 22, 1969. However, there is a great need in industry today in particular the area of finishes for appliances, such as stoves, refrigerators, washers, dryers and the like for finishes that are highly durable, flexible, scratch resistant, mar resistant, stain resistant, solvent resistant. Moreover, industry today is in need of a stable coating composition for metal coils or sheets that can be applied by conventional coil coating techniques to give a finish that will withstand post forming operations that are used to make the aforementioned appliances or used, for example, to form commercial or residential outdoor siding. Finishes on metal sheets that are used in post forming operations require a particularly high degree of toughness, durability and flexibility, also the finish should not crack, stain or mar under subsequent use.

The novel composition of this invention is stable and provides finishes that have outstanding physical properties. The combination of the unique polyester and a blocked organic polyisocyanate in the coating composition provides a coating that readily cross-links to a high quality finish.

SUMMARY OF THE INVENTION

The liquid coating composition of this invention comprises 5–70% by weight, based on the weight of the coating composition, of film-forming constituents and 95–30% by weight, based on the weight of the coating composition, of a solvent for the film forming constituents, wherein the film-forming constituents consist essentially of (A) a polyester that is substantially free of unreacted carboxyl groups and has a molecular weight of 500–10,000 and has a hydroxyl content of about 1.5 to 9% by weight and consists essentially of
  (a) 50–60 mole percent of a hydroxyl containing constituent which consists of 10 to 100 mole percent of a polyol that has 3 to 10 hydroxyl groups, and a molecular weight of 90–1,000, and correspondingly, 90–0% of a diol of the formula

HO—R—OH wherein R is an alkyl group having 2 to 10 carbon atoms; and
  (b) 50–40 mole percent of an acid constituent that consists of 100–10 mole percent of an aromatic dicarboxylic acid or an anhydride thereof, and correspondingly 0–90 mole percent of a saturated aliphatic dicarboxylic acid or an anhydride thereof or an alicyclic dicarboxylic acid or an anhydride thereof; and
(B) a block polyisocyanate cross-linking agent; wherein the ratio of polyisocyanate to polyester is determined in equivalents of isocyanate groups of the polyisocyanate to free hydroxyl groups of the polyester and wherein the ratio of equivalents of isocyanate to hydroxyl is from about 1.5:1 to about 0.5:1.

DESCRIPTION OF THE INVENTION

The novel coating composition of this invention is a stable blend of a hydroxyl containing polyester and a blocked polyisocyanate, in a solvent for the blend. After the composition is applied to a substrate, it is heated to cross-link the composition in a tough, flexible, durable, scratch and stain resistant finish.

The polyester utilized in the novel coating composition is substantially free of unreacted carboxyl groups and has a molecular weight of about 500–10,000 and the hydroxyl content of 1.5 to 9%, preferably 2 to 8%. The polyesters are prepared by reacting 50 to 60 mole percent of a hydroxyl containing constituent with about 50 to 40 mole percent of a dibasic acid constituent. The hydroxyl containing constituent contains 10 to 100 mole percent of a polyol, and correspondingly, 90 to 0% of a diol. The dibasic acid constituent contains 10 to 100 mole percent of an aromatic acid or the anhydride thereof and the correspondingly 90 to 0% of an aliphatic dicarboxylic acid or an anhydride thereof or an alicyclic dicarboxylic acid or an anhydride thereof.

The polyols utilized in this invention to form the polyester contain 3 to 10 hydroxyl groups and are of a low molecular weight of about 90 to 1,000.

The typical group of polyols useful for forming the polyester have the formula $R^1_mC—(CH_2OH)_n$  wherein $R^1$ is either hydrogen, OH, or an alkyl group having 1 to 3 carbon atoms and wherein n and m are positive integers and n can be 2 to 4 and m can be 0 to 2 except when $R^1$ is OH, m is 1. Typical polyols of this type are trimethylol propane, trimethylol ethane, pentaerythritol and glycerin.

Other polyols that can be used to form the polyester are sorbitol, mannitol, α-methylglucoside and hexane triol. Resinous polyols can also be used such as a reaction product of styrene and allyl alcohol.

Diols can be utilized to form the polyester used in this invention. However, for some particular end uses the diol is omitted from the composition and only the aforementioned polyols are utilized to form the polyester. The diols can be used to form the polyester as a general formula HO—R—OH, wherein R is an aliphatic group or an alicyclic group. Typical diols that can be used to form the polyester are, for example, ethylene glycol, propylene glycol, diethylene glycol, dipropylene glycol, butane diol, pentane diol, decamethylene glycol, neopentyl glycol, 1,4-cyclohexane dimethanol.

Neopentyl glycol is the one preferred glycol used to prepare the polyester since high quality compositions can be prepared from polyesters utilizing this glycol.

The dicarboxylic acid constituent used to prepare the polyester can be any of the following aromatic dicarboxylic acids, aliphatic dicarboxylic acids, alicyclic dicarboxylic acids or the anhydrides of any of these acids:

saturated aliphatic dicarboxylic acids, such as succinic, glutaric, adipic, pimelic, suberic, azelaic, brassic, dodecanedoic and the like;
alicyclic dicarboxylic acids, such as hexahydroisophthalic acid, hexahydroterephthalic acid, tetrahydroisophthalic acid, tetrahydroterephthalic acid, hexahydrophthalic acid, tetrahydrophthalic acid;
aromatic dicarboxylic acids, such as isophthalic, terephthalic acid, and the like;
1,5-naphthalene dicarboxylic acid;
1,4-naphthalene dicarboxylic acid;
1,6-naphthalene dicarboxylic acid;
1,7-naphthalene dicarboxylic acid;
2,4-naphthalene dicarboxylic acid;
2,5-naphthalene dicarboxylic acid;
2,6-naphthalene dicarboxylic acid;
2,7-naphthalene dicarboxylic acid;
2,8-naphthalene dicarboxylic acid, and the like;
2,2'-bibenzoic dicarboxylic acid;
3,3'-bibenzoic dicarboxylic acid;
4,4'-bibenzoic dicarboxylic acid;
2,3'-bibenzoic dicarboxylic acid;
3,4'-bibenzoic dicarboxylic acid, and the like;
2,2'-isopropylidene dibenzoic acid;
3,3'-isopropylidene dibenzoic acid;
4,4'-isopropylidene dibenzoic acid;
2,3'-isopropylidene dibenzoic acid;
3,4'-isopropylidene dibenzoic acid;
2,2'-methylene dibenzoic acid;
3,3'-methylene dibenzoic acid;
4,4'-methylene dibenzoic acid;
2,2'-ethylene dibenzoic acid;
4,4'-ethylene dibenzoic acid;
2,2'-hexafluoroisopropylidene dibenzoic acid;
4,4'-hexafluoroisopropylidene dibenzoic acid, and the like,
2,2'-ketodibenzoic acid;
3,3'-ketodibenzoic acid;
4,4'-ketodibenzoic acid;
2,2'-oxydibenzoic acid;
3,3'-oxydibenzoic acid;
4,4'-oxydibenzoic acid;
4,4'-thiodibenzoic acid;
2,2'-thiodibenzoic acid;
3,3'-thiodibenzoic acid, and the like;
2,2'-sulfonedibenzoic acid;
3,3'-sulfonedibenzoic acid;
4,4'-sulfonedibenzoic acid, and the like.

One preferred acid is phthalic acid.

The polyester utilized in this invention is prepared by blending together the acid constituent and the polyol constituent and the diol constituent, if used. The composition is then heated to about 140 to 280° C. and reacted until the esterification is completed which may be from 2–12 hours. The fusion process may be used to prepare the polyester in which the polyester is prepared without the use of solvent and nitrogen gas or carbon dioxide gas is used to purge the reaction vessel from the water resulting from the reaction. The solution process may also be utilized to form the polyester in which about 2–15% by weight, based on the weight of the reactants, of a solvent is utilized and the composition is heated to its reflux temperature to remove water by azeotropic distillation.

Typical solvents that can be utilized to prepare the polyester or to dilute the resulting polyester or the coating composition are, for example, hydrocarbons, solvents, ketones, such as methylethyl ketone, methylisobutyl ketone, toluene, xylene and certain petroleum fractions.

A catalyst can be used in the esterification reaction in amounts of 0.01–1% by weight of the reactants. Typical esterification catalyst are, for example, sulfonic acids, organo tin compounds, litharge, titanium complexes and the like.

A blocked polyisocyanate cross-linking agent is utilized to form the novel coating composition of this invention. Any polyisocyanate that can be reacted with another chemical compound to form a thermally unstable reaction product can be utilized. This reaction product (blocked polyisocyanate) must be stable below 50° C. for long periods of time and must be compatible with the polyester used to form the coating composition. However, this product must break down under moderate baking conditions, for example, of 125–200° C. to form a polyisocyanate with reactive isocyanate groups that will cross-link with the polyester of the novel composition.

Typical blocking agents that can be used to form the block polyisocyanate cross-linking agent used in the coating composition of this invention are, for example, phenol compounds, alcohols, such as tertiary butyl alcohol, ketoximes, hindered glycol esters, and the like. Typical phenol compounds that can be used are phenol, propyl phenol, tertiary butyl phenol, nonyl phenol, other monohydric phenols, bromo phenol, 2-chloro phenol, dichloro phenol, lithoxy phenol, 2-methoxy nitrophenol and the like. Preferably, ketoximes are used as blocking agents for the polyisocyanate used in this invention. Some preferred ketoximes are, for example, acetooxime, methyl ethyl ketoxime, diisobutyl ketoxime and the like.

The following polyisocyanates when blocked with one of the aforementioned blocking agents are useful in forming the novel coating composition of this invention. It should be pointed out if discoloration of the coating causes a problem due to exposure to actinic light, polyisocyanates containing aromatic radicals should not be utilized in the composition, in those cases, it is preferable to use saturated aliphatic or alicyclic polyisocyanates. The following is a list of these useful polyisocyanates:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate, 3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
2,6-diisocyano-pyridine,
bis-(4isocyano-phenyl)diethyl silane,
bis-(4-isocyano-phenyl)diphenyl silane,
dichloro-biphenylene diisocyanate,
bis-(4-isocyano-phenyl) ethyl phosphine oxide,
bis-(4-isocyano-phenyl)phenyl phosphine oxide
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-($\beta$-isocyano-t-butyl)toluene,
bis-(para-$\beta$-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3 O(CH_2)_2 O(CH_2)_3 NCO$,
$OCN(CH_2)_3 S(CH_2)_3 NCO$ and
$OCN(CH_2)_3 N(CH_2)_3 NCO$.
polymethylene polyphenyl isocyanate

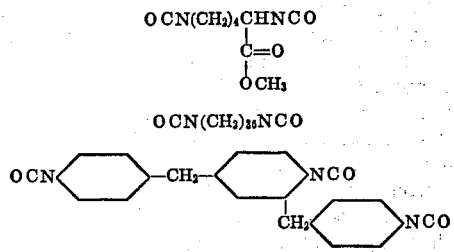

where $R^2$ is an alkylene group having 1-6 carbon atoms, especially preferred is this polyisocyanate blocked with a ketoxime, such as methylethyl ketoxime;

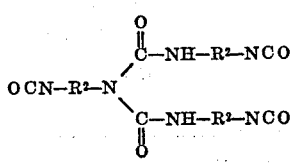

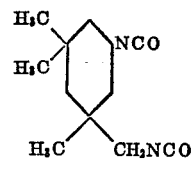

and

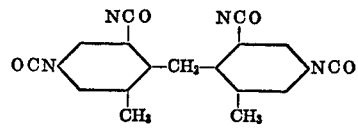

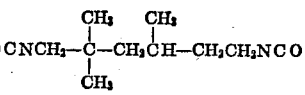

The following are blocked polyisocyanates used in this invention that give high quality products:

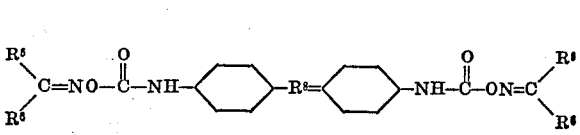

where $R^8$ is an alkylene group of 1-6 carbon atoms; $R^5$ and $R^6$ are each an alkyl group of 1-4 carbon atoms; one example of this compound is the reaction product of 1 mole of 4,4'-methylene bis-(cyclohexyl isocyanate) and 2 moles of methyl ethyl ketoxime:

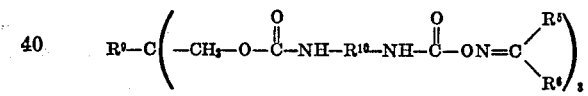

wherein $R^5$ and $R^6$ are as defined above, $R^9$ is an alkyl group having 1-2 carbon atoms and $R^{10}$ is a divalent alicyclic radical; an example of this compound is the reaction product of trimethylol propane or trimethylol ethane, 4,4 - methylene - bis - (cyclohexyl isocyanate) and methyl ethyl ketoxime reacted in a molar ratio of 1/3/3.3;

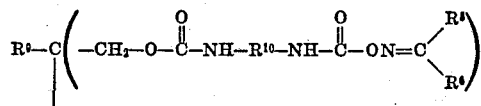
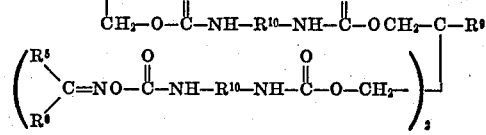

wherein $R^5$, $R^6$, $R^9$, $R^{10}$ are as defined above; and example of this compound is the reaction product of trimethylol propane or trimethylol ethane, 4,4'-methylene-bis-(cyclohexyl isocyanate), methyl ethyl ketoxime reacted in a molar ratio of 2/5/4.4.

One preferred group of blocked polyisocyanates are prepared by reacting one of the aforementioned polyols with an alkylene oxide such as propylene oxide or ethylene oxide. This product is then reacted with any of the aforementioned polyisocyanates in an isocyanate to hydroxyl ratio of 2:1 to form an adduct. This adduct is then reacted with one of the aforementioned blocking agents to form the blocked polyisocyanate.

The blocked isocyanate has the formula:

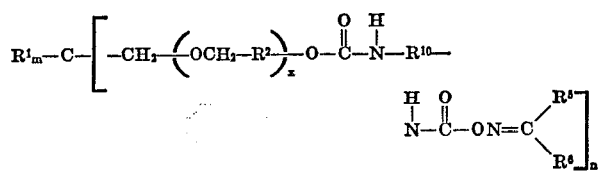

wherein $R^1$, $R^2$, $R^5$, $R^6$, $R^{10}$ and $m$ are as previously defined, X is a positive integer from 1–10 and $n$ is a positive integer of 2–4.

One compound of this type is the reaction product of trimethylol propane and propylene oxide which is subsequently reacted with 4,4'-methylene-bis(cyclohexyl isocyanate) and this compound is blocked with methyl ethyl ketoxime. Another useful compound is the reaction product of pentaerythritol and propylene oxide which is reacted with 4,4'-methylene-bis(cyclohexyl isocyanate) and blocked with methyl ethyl ketoxime. Glycerine reacted with propylene oxide which is subsequently reacted with 4,4'-methylene-bis(cyclohexyl isocyanate) and blocked with methyl ethyl ketoxime is also very useful. The polyol from polycaprolactone having a molecular weight of about 540 reacted with propylene oxide and this adduct is subsequently reacted with 4,4'-methylene-bis(cyclohexyl isocyanate) and is blocked with methyl ethyl ketoxime.

To form the novel coating composition of this invention, the polyester is formed into a solution using a suitable solvent. Then this solution is blended with a solution of the blocked polyisocyanate to form the coating composition. Preferably, the composition has a film-forming polymer solids content of 20–50% by weight.

Suitable solvents which can be used to prepare the coating composition of this invention are toluene, xylene, butyl acetate, ethylene glycol monoethylether acetate, acetone, methylisobutyl ketone, methylethyl ketone, and other aliphatic, cycloaliphatic and aromatic hydrocarbons, esters, ethers and ketones which are non-reactive with the constituents of the coating composition.

Preferably, about 0.01–1.0% by weight, based on the weight of the film-forming constituents of this invention, of a catalyst is added to the coating composition to accelerate cross-linking of the polyester and polyisocyanate once the coating composition has been applied. Typically useful catalysts are as follows: the organo tin catalysts such as butyl tin dilaurate, dibutyl tin di-2-ethylhexoate; stannous octoate, stannous oleate and the like; zinc naphthenate, cobalt naphthenate, vanadium acetyl acetonate, zirconium acetyl acetonate, acetyl acetonate titanate and the like; tertiary amines such as triethylene diamine, triethyl amine and substituted morpholines.

One particularly preferred catalyst system comprises about 0.01–0.05% by weight of cobalt metal, based on the weight of the film-forming constituents and 0.05–0.3% by weight, based on the weight of the film-forming constituents, of a chelated titanium complex such as acetyl acetonate titanate chelate prepared according to Example 1 of Hughes and Paulsen U.S. Pat. 3,682,688, issued Aug. 5, 1972.

Cellulose acetate butyrate can be added to the novel coating composition of this invention in amounts of 0.5–5.0% by weight, based on the weight of the film-forming constituents, to improve gloss, smoothness and overall appearance of the resulting finish. The cellulose acetate butyrate used in this invention has a butyryl content of about 35–55% by weight, a hydroxyl content of about 0.8–2.0% by weight and a viscosity of about 0.01–5 seconds determined according to ASTMD-1343-56.

Antioxidants can also be added to the novel coating composition of this invention in amounts of 0.01–0.05% by weight, based on the weight of the film-forming constituents. These antioxidants provide the finish with overbake discoloration resistance. Typical hindered phenol antioxidants can be used such as di-tertiary-butyl-p-cresol.

For most uses, the novel coating composition of this invention is pigmented. The pigment to binder ratio can vary from about 1:100 to about 200:100. The term "binder" refers to the film-forming materials in the coating composition. Typical pigments which can be used are metallic oxides, such as titanium dioxide, zinc oxide, iron oxide and the like, metal hydroxides, metal flakes, metal powders, chromates, such as lead chromate, sulfides, sulfates, carbonates, carbon black, silica, talc, china clay, iron blues, organic reds, maroons and organic dyes and lakes.

The pigments are introduced into the coating composition by first forming a mill base with the polyester composition by conventional sand grinding or ball milling techniques. The mill base is then blended with the film-forming polymer as shown in the following examples.

The novel coating composition can be applied to a variety of substrates such as steel, aluminum, zinc, copper, and other metals, glass, plastics and the like by conventional techniques of brushing, spraying, flow-coating, dip-coating, coil-coating, roller-coating or electrodeposition. After the coating is applied, it is baked from 1 minute to 90 minutes at 150–275° C.

The novel coating composition of this invention preferably is applied over suitably treated primed metal substrates such as a steel substrate treated with zinc phosphate or a metal substrate coated with typical alkyd primers or epoxy primers which are pigmented with iron oxide, carbon black, titanium dioxide and the like. The novel composition can be used directly over galvanized steel or untreated aluminum.

The novel composition of this invention forms a finish which is hard, flexible, durable, weatherable, scratch and grease resistant which makes the coating composition particularly suitable for appliances, truck bodies, auto bodies, airplane equipment, railroad equipment, vending machines, outdoor equipment, outdoor metal siding such as aluminum siding and the like. The novel composition is particularly useful in coil coating wherein the coated metal sheet material is to be subjected to post forming techniques; for example, coated aluminum for outdoor siding and coated sheets for parts of appliances. The extreme flexibility, durability, scuff and mar resistance of the finish make these particular end uses possible.

The following examples illustrate the invention. All quantities are on a weight basis unless otherwise indicated.

A polyester composition is prepared as follows:

Example 1

| | Parts by weight |
|---|---|
| Trimethylol propane | 1340 |
| Phthalic anhydride | 1332 |
| Total | 2672 |

The above ingredients are charged into a reaction vessel equipped with a thermometer, a condenser, a water separator and an agitator. The ingredients are blanketed with nitrogen and are thoroughly mixed and then heated while under constant agitation to a temperature of about 170° C. for about a 60 minute period. The temperature of the reaction mixture is slowly increased to about 230° C. in about 90 minutes and then held at this temperature for about 4 hours. About 164 parts by weight of water are distilled from the reaction mixture.

The resulting polyester has an acid number of 4.28 and a hydroxyl content of 7.8%. The Gardner Holdt viscosity at 25° C. of a 50% polymer solid solution in ethylene glycol monoethyl ether acetate is about U.

A polyisocyanate is prepared as follows:

| Portion 1: | Parts by weight |
|---|---|
| 4,4'-methylene-bis-(cyclohexylisocyanate) | 262.00 |
| Dibutyl tin dilaurate | 0.12 |
| Portion 2: | |
| Propylene oxide adduct of glycerine having a molecular weight of 420 | 141.0 |
| Toluene | 403.00 |
| Total | 806.12 |

Portion 1 is charged into a reaction vessel equipped with a thermometer and a stirrer. The mixture is blanketed with nitrogen. Portion 2 is pre-mixed and slowly added to the reaction vessel over a one hour period. A slight exothermic reaction occurs raising the temperature to about 57° C. and the reaction mixture is held at about 55° C. for about 2½ hours. The resulting composition has a 50% solids content, a Gardner Holdt viscosity at 25° C. of about D, an acid number of 6.7 and has a calculated isocyanate content of 5.0%.

A blocked polyisocyanate is then prepared as follows:

| | Parts by weight |
|---|---|
| Polyisocyanate solution prepared above (50% solids) | 403 |
| Methyl ethyl ketoxime | 48 |
| Total | 451 |

The above ingredients are charged into a reaction vessel and are slowly heated to 50° C. and held at this temperature for 1 hour.

A polyester solution is prepared by blending the following ingredients:

| | Parts by weight |
|---|---|
| Polyester (prepared above) | 60 |
| Ethylene glycol monoethyl ether acetate | 20 |
| Ethyl acetate | 20 |
| Total | 100 |

A mill base is then prepared as follows:

| | Parts by weight |
|---|---|
| Polyester solution (60% solids, prepared above) | 29 |
| Ethylene glycol monoethyl ether acetate | 15 |
| Titanium dioxide pigment (Rutile) | 56 |
| Total | 100 |

The above ingredients are thoroughly blended together and charged into a conventional sand mill and ground to a fineness of 0.5 mil.

The following ingredients are blended together to form a paint composition:

| | Parts by weight |
|---|---|
| Mill base (prepared above) | 100.0 |
| Polyester solution (prepared above) | 11.7 |
| Blocked polyisocyanate solution (prepared above) | 95.6 |
| Cellulose acetate butyrate solution (25% by weight cellulose acetate butyrate having a ½ second of viscosity in methyl isobutyl ketone) | 2.0 |
| Total | 209.3 |

The above prepared paint composition is applied with a wire wound rod onto a zinc phosphate coated steel panel. The panel is baked for 30 minutes at 180° C. The resulting coating is about 1.0 mil in thickness and has an excellent appearance. The coating has a pencil hardness of 3H and is resistant to stains, mars and scratches and is flex and impact resistant.

Example 2

A polyester composition is prepared as follows:

| | Parts by weight |
|---|---|
| Trimethylol propane | 670 |
| Phthalic anhydride | 1332 |
| Neopentyl glycol | 520 |
| Total | 2522 |

The above ingredients are charged into a reaction vessel equipped with a thermometer, condenser, water separator and an agitator. The ingredients are blanketed with nitrogen and are thoroughly mixed and heated to about 190° C. As water is distilled from the reaction mixture, the temperature increases to about 230° C. over a 3 hour period. The reaction mixture is held at this temperature for an additional 6 hours. About 191 parts by weight of water are distilled from the composition.

The resulting polyester has an acid number of 9.81, a hydroxyl content of 4.3% and a 50% polymer solids solution in ethylene glycol monoethyl ether acetate has a Gardner Holdt viscosity at 25° C. of about P.

A polyester solution is prepared by thoroughly blending the following ingredients:

| | Parts by weight |
|---|---|
| Polyester (prepared above) | 50 |
| Ethylene glycol monoethyl ether acetate | 50 |
| Total | 100 |

A blocked isocyanate is prepared as follows:

| | Parts by weight |
|---|---|
| Portion 1: | |
| 4,4'-methylene-bis-(cyclohexylisocyanate) | 594.00 |
| Dibutyl tin dilaurate | 0.30 |
| Xylene | 890.00 |
| Portion 2: | |
| Ethylene glycol monoethyl ether acetate | 890.00 |
| Polyol from polycaprolactone having a molecular weight of 540 | 408.00 |
| Portion 3: | |
| Methyl ethyl ketoxime | 217.00 |
| Total | 2999.30 |

Portion 1 is charged into a reaction vessel equipped with a thermometer and a stirrer and is blanketed with nitrogen. Portion 2 is pre-mixed and slowly added to the reaction vessel over a 1 hour period. The reaction mixture is heated to about 57° C. and held at this temperature for about 2 hours. The temperature of the reaction mixture is reduced to about 40° C. and portion 3 is then added over a 2 hour period. Then the temperature of the mixture is raised to about 50° C. and held at this temperature for an additional hour. The resulting composition has a 39.4% solids content and a Gardner Holdt viscosity measured at 25° C. of about E.

A mill base is prepared by blending the following ingredients:

| | Parts by weight |
|---|---|
| Polyester solution (prepared above) | 20 |
| Ethylene glycol monoethyl ether acetate | 20 |
| Titanium dioxide pigment (rutile) | 60 |
| Total | 100 |

The above ingredients are thoroughly blended and charged into a conventional sand mill and ground to a 0.5 mil fineness.

A paint composition is prepared by blending the following ingredients:

| | Parts by weight |
|---|---|
| Mill base (prepared above) | 100 |
| Polyester solution (prepared above) | 46 |
| Blocked polyisocyanate solution (prepared above) | 110 |
| Cellulose acetate butyrate solution (described in Example 1) | 2 |
| Total | 258 |

The above ingredients are thoroughly blended to form the paint composition.

The above paint is applied with a wire wound rod onto an aluminum substrate. The coated substrate is baked at 265° C. for about 75 seconds. The resulting coating is about 1 mil in thickness and has an excellent appearance. The coating has a pencil hardness of H and has a good flexibility and is mar, stain, solvent and impact resistant. The aluminum panel coated with the above prepared composition can be used as siding for commercial and residential buildings.

Example 3

A polyester composition is prepared as follows:

| | Parts by weight |
|---|---|
| Trimethylol propane | 402 |
| Neopentyl glycol | 1664 |
| Phthalic anhydride | 2664 |
| Total | 4730 |

The above ingredients are charged into a reaction vessel equipped with a thermometer, condenser, water separator and an agitator. The ingredients are blanketed with nitrogen and are thoroughly mixed and heated to about 180° C. As water is distilled from the reaction mixture, the temperature of the reaction mixture increased to about 230° C. over a 2 hour period. The reaction mixture is held at this temperature for an additional 12 hours. About 246 parts by weight of water are distilled from the composition. The resulting polyester has an acid number of 6.1, a hydroxyl content of 2.0% and a 50% solids solution in ethylene glycol monoethyl ether acetate has a Gardner Holdt viscosity measured at 25° C. of about K.

A polyester solution is prepared by blending the following ingredients:

| | Parts by weight |
|---|---|
| Polyester (prepared above) | 50 |
| Ethylene glycol monoethyl ether acetate | 50 |
| Total | 100 |

A blocked polyisocyanate is prepared as follows:

| | Parts by weight |
|---|---|
| Portion 1: | |
| "Desmodur" N-75 (a solution of 75% by weight of hexamethylene diisocyanate biuret in a mixture of organic solvents) | 508.0 |
| Dibutyl tin dilaurate | 0.1 |
| Portion 2: | |
| Methyl ethyl ketoxime | 192.0 |
| Total | 700.1 |

Portion 1 is charged into a reaction vessel equipped with a thermometer and a stirrer and is blanketed with nitrogen. Portion 2 is slowly added to the reaction mixture which is under constant agitation over a 2 hour period and the temperature of the reaction mixture is slowly increased to about 55° C. and maintained at this temperature for about 1 hour. About 100 parts by weight of a solvent mixture of xylene and Cellosolve acetate in a 1:1 ratio are added to the reaction mixture and the reaction mixture is held at about 55° C. for an additional hour. The resulting composition has a solids content of 69%, a Gardner Holdt viscosity measured at 25° C. of $Z_1$ and the blocked polyisocyanate has an acid number of 0.27.

The following ingredients are blended together to form a mill base:

| | Parts by weight |
|---|---|
| Polyester solution (prepared above) | 20 |
| Ethylene glycol monoethyl ether acetate | 20 |
| Titanium dioxide pigment (rutile) | 60 |
| Total | 100 |

The above ingredients are charged into a conventional sand mill and ground to a 0.5 mil fineness.

A paint composition is prepared by thoroughly blending the following ingredients:

| | Parts by weight |
|---|---|
| Mill base (prepared above) | 100.0 |
| Polyester solution (prepared above) | 96.2 |
| Blocked isocyanate solution | 24.6 |
| Cellulose acetate butyrate solution (described in Example 1) | 2.0 |
| Total | 222.8 |

The above prepared paint composition is applied with a wire wound rod to a zinc phosphate coated steel plate and the coated plate is baked for 30 minutes at 165° C. The resulting coating is 1.2 mils in thickness and has an excellent appearance. The coating has a pencil hardness of 2 H and is solvent, stain, mar, impact and flex resistant.

Example 4

A polyester composition is prepared as follows:

| | Parts by weight |
|---|---|
| Trimethylol propane | 670 |
| Neopentyl glycol | 520 |
| Phthalic anhydride | 740 |
| Adipic acid | 584 |
| Total | 2514 |

The above ingredients are charged into a reaction vessel equipped with a thermometer, condenser, water separator, and an agitator. The ingredients are thoroughly mixed and blanketed with nitrogen and the temperature of the reaction mixture is gradually increased to about 160° C. Water is distilled from the reaction mixture over a 5½ hour period while the temperature of the reaction mixture is maintained at the distillation temperature. As water is removed from the reaction mixture, the temperature of the mixture increases to about 240° C.

The resulting polyester has an acid number of about 10 and a hydroxyl content of about 4.9% and a 50% solids solution of the polyester in ethylene glycol monoethyl ether acetate has a Gardner Holdt viscosity measured at 25° C. of T.

A polyester solution is prepared by blending the following ingredients:

| | Parts by weight |
|---|---|
| Polyester | 50 |
| Ethylene glycol monoethyl ether acetate | 50 |
| Total | 100 |

A mill base is prepared by blending the following ingredients:

| | Parts by weight |
|---|---|
| Polyester solution (prepared above) | 20 |
| Ethylene glycol monoethyl ether acetate | 20 |
| Titanium dioxide (rultile) | 60 |
| Total | 100 |

The above ingredients are charged into a conventional sand mill and ground to a 0.5 mil fineness.

A paint is prepared by thoroughly blending the following ingredients:

| | Parts by weight |
|---|---|
| Mill base (prepared above) | 100.0 |
| Polyester solution (prepared above) | 44.6 |
| Blocked polyisocyanate solution (described in Example 1) | 84.0 |
| Cellulose acetate butyrate solution (described in Example 1) | 2.0 |
| Total | 230.6 |

The above paint is applied with a wire wound rod to a zinc phosphate coated steel plate and an aluminum plate. The coated steel plate is baked at 165° C. for 30 minutes and the coated aluminum plate is baked at 270° C. for 60 seconds. The coated steel plate has a pencil hardness of 4H and the coated aluminum plate has a pencil hardness of H. Both coated plates have outstanding impact and flex resistance and also have good solvent stain and mar resistance. The coated aluminum panel is useful as siding for a commercial and residential building.

Example 5

A polyisocyanate is prepared as follows:

| | Parts by weight |
|---|---|
| Portion 1: | |
| 4,4'-methylene-bis-(cyclohexyl isocyanate) | 262.00 |
| Dibutyl tin dilaurate | 0.11 |
| Portion 2: | |
| Polyether tetrol having a molecular weight of 404 | 101.00 |
| Toluene | 303.00 |
| Portion 3: | |
| Methyl ethyl ketoxime | 105.00 |
| Total | 771.11 |

Portion 1 is charged into a reaction vessel equipped with a thermometer and stirrer and thoroughly mixed. Portion 2 is premixed and then slowly added over a 2 hour period to the reaction vessel. The temperature of the reaction mixture rises to 50° C. and this temperature is maintained for 3 hours and the mixture is then cooled to 40° C. Portion 3 is then added to the reaction mixture over 1 hour and the reaction mixture is maintained at 55° C. for an additional 2 hours. The resulting composition has a solids content of 60% and a Gardner Holdt viscosity at 25° C. of Y.

The following ingredients are blended together to form a paint composition:

| | Parts by weight |
|---|---|
| Mill base (prepared in Example 1) | 100.0 |
| Polyester solution (prepared in Example 1) | 9.4 |
| Blocked polyisocyanate solution (prepared above) | 89.5 |
| Cellulose acetate butyrate solution (described in Example 1) | 2.0 |
| Total | 200.9 |

The above ingredients are thoroughly blended together to form a paint composition.

The paint composition is applied with a wire wound rod onto aluminum panels which are then baked for 30 minutes at 176° C. The resulting coating is about 1.0 mils in thickness on the panels and the coating has an excellent appearance and a pencil hardness of 3H and the film is solvent, scratch, mar, stain and flex resistant.

Example 6

The following ingredients are blended together to form a paint composition:

| | Parts by weight |
|---|---|
| Mill base (prepared in Example 1) | 9072.0 |
| Polyester solution (prepared in Example 1) | 650.0 |
| Blocked polyisocyanate solution (prepared below) | 6368.0 |
| Hydrocarbon solvent (boiling point 182–219° C.) | 940.0 |
| Diethylene glycol monobutyl ether | 704.0 |
| Isophorone | 116.0 |
| "Triton" X-100 (alkyl phenoxy polyethoxy ethanol) | 160.0 |
| Cellulose acetate butyrate solution (25% solids CAB ½ second viscosity in methyl isobutyl ketone) | 320.0 |
| Cobalt naphthenate (6% cobalt) | 32.0 |
| Antioxidant solution (10% solids of di-tertiary-butyl-p-cresol in diethylene glycol monobutyl ether) | 17.6 |
| "Tyzor" AA titanate catalyst solution (60% solids of acetyl acetonate titanate chelate) prepared according to Example 1 of Hughes and Paulsen U.S. Pat. 3,682,688, issued Aug. 5, 1972 | 10.0 |
| Total | 18,299.6 |

The blocked polyisocyanate solution used above is prepared as follows:

| | Parts by weight |
|---|---|
| Portion 1: | |
| 4,4'-methylene-bis(cyclohexyl isocyanate) | 1043.0 |
| Dibutyl tin dilaurate | 0.3 |
| Portion 2: | |
| Propylene oxide adduct of glycerine having a moleculate weight of 420 | 561.0 |
| Hydrocarbon solvent (boiling point 182–219° C.) | 1033.0 |
| Portion 3: | |
| Methylethyl ketoxime | 363.0 |
| Total | 3000.3 |

Portion 1 is charged into a reaction vessel equipped with a stirrer and a thermometer. The mixture is blanketed with nitrogen. Portion 2 is premixed and slowly added to the reaction mixture over a one hour period and the reaction mixture is maintained at about 55° C. for about 2½ hours. Then Portion 3 is slowly added to the reaction mixture and the reaction mixture is held at a temperature of about 50° C. for an additional hour. The resulting composition has a 53% solids content.

The above prepared paint composition is applied to the following coils of metal by a conventional coil coating machine and the coating is heated to a metal temperature of 220° C. to fully cure the coating: aluminum, cold rolled steel treated with "Bonderite" 901 (iron phosphate) and electrogalvanized steel. In each case, the resulting finish has an excellent appearance, is free of popping and cratering, has excellent stain resistance to mustard, lipstick and orange dye, has a pencil hardness of 4H to 5H, impact resistance up to 80 inch pounds, is flexible as shown by a mandrel bend test using a ⅛ inch minimum diameter mandrel without cracking the coating and has excellent mar resistance as shown by a Tabor abrasion test in which a loss of 42 mg. is noted as 500 cycles using a 1000 gram load.

What is claimed is:

1. A liquid coating composition comprising 5–70% by weight, based on the weight of the coating composition, of a binder of film-forming constituents and correspondingly 95–30% by weight, based on the weight of the coating composition, of a solvent for the binder of film-forming constituents and containing pigment in a pigment to binder ratio of 1:100 to 200:100, wherein the binder of film-forming constituents consists essentially of (A) a polyester having a molecular weight of about 500–10,000 and a hydroxyl content of 1.5–9% consisting essentially of
- (a) 50 to 60 mole percent of trimethylolpropane and
- (b) 50 to 40 mole percent of phthalic anhydride, and (B) a blocked polyisocyanate cross-linking agent of the reaction product of a propylene oxide adduct of glycerine, and 4,4'-methylene-bis(cyclohexyl isocyanate) blocked with methylethyl ketoxime;

wherein the ratio of blocked polyisocyanate to polyester, determined in equivalents of isocyanate groups to free hydroxyl groups, is from about 1.5:1 to about 0.5:1, and wherein the coating composition contains
- 0.05–5.0% by weight, based on the weight of the film-forming constituents, of cellulose acetate butyrate having a viscosity of 0.01–5 seconds;
- 0.01–0.05% by weight, based on the weight of the film-forming constituents, of a cobalt metal catalyst, and
- 0.05–0.3% by weight of an acetyl acetonate titanate chelate catalyst.

References Cited

UNITED STATES PATENTS

| Number | Date | Name | Class |
|---|---|---|---|
| 2,374,136 | 4/1945 | Rotrrock | 260—22 |
| 2,982,754 | 5/1961 | Sheffer et al. | 260—33.4 |
| 2,993,813 | 7/1961 | Tischbein | 117—161 |
| 3,056,818 | 10/1962 | Werber | 260—410.6 |
| 3,122,451 | 2/1964 | Bunge et al. | 117—232 |
| 3,463,758 | 8/1969 | Stewart | 260—75 |
| 3,473,951 | 10/1969 | De Rossi et al. | 117—72 |
| 3,554,951 | 1/1971 | Blomeyer et al. | 260—29.1 |
| 3,252,848 | 5/1966 | Borsellino | 260—77.5 TB X |
| 3,317,463 | 5/1967 | Schonfeld et al. | 260—77.5 TB X |
| 3,682,688 | 8/1972 | Hughes et al. | 117—168 |

OTHER REFERENCES

Saunders et al.: Polyurethanes, part 2, Interscience, New York, 1964, pp. 485–498.

DONALD E. CZAJA, Primary Examiner

H. S. COCKERAM, Assistant Examiner

U.S. Cl. X.R.

260—37 N, 75 NB, 75 NK, 77.5 TB